US012417729B2

(12) United States Patent
Nam et al.

(10) Patent No.: US 12,417,729 B2
(45) **Date of Patent: *Sep. 16, 2025**

(54) POWER CONTROL CIRCUIT FOR DISPLAY DEVICE

(71) Applicant: SAMSUNG DISPLAY CO., LTD., Yongin-si (KR)

(72) Inventors: Yanguk Nam, Hwaseong-si (KR); Jongjae Lee, Hwaseong-si (KR); Sujin Kim, Ulsan (KR); Daesik Lee, Hwaseong-si (KR); Junki Hong, Bucheon-si (KR); Heejeong Seo, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/876,380

(22) Filed: May 18, 2020

(65) Prior Publication Data

US 2020/0279523 A1 Sep. 3, 2020

Related U.S. Application Data

(63) Continuation of application No. 15/827,395, filed on Nov. 30, 2017, now Pat. No. 10,657,878.

(30) Foreign Application Priority Data

Dec. 6, 2016 (KR) ........................ 10-2016-0165142

(51) Int. Cl.
*G09G 3/20* (2006.01)
*G09G 3/36* (2006.01)
*G09G 3/00* (2006.01)

(52) U.S. Cl.
CPC ......... *G09G 3/2096* (2013.01); *G09G 3/3611* (2013.01); *G09G 3/3677* (2013.01);
(Continued)

(58) Field of Classification Search
None
See application file for complete search history.

(56) References Cited

U.S. PATENT DOCUMENTS 5,644,332 A * 7/1997 Matsuzaki ........... G09G 3/3629
345/100
5,703,823 A 12/1997 Douse et al.
(Continued)

FOREIGN PATENT DOCUMENTS

KR 1019950027831 A 10/1995
KR 1020090080622 A 7/2009
(Continued)

*Primary Examiner* — Benjamin C Lee
*Assistant Examiner* — Emily J Frank
(74) *Attorney, Agent, or Firm* — CANTOR COLBURN LLP

(57) ABSTRACT

A display device includes a display panel, pixels on the display panel, data and gate drivers, a timing controller which applies control signals respectively to the data and gate drivers, and a power management integrated circuit ("PMIC") which applies a driving voltage to the data and gate drivers. The timing controller detects an operational condition of the display panel and selects one of stored power setting values to output the selected one of the power setting values to the PMIC. The PMIC includes, first and second storage banks, a controller which receives the power setting value from the timing controller, stores the power setting value in one of the first and second storage banks, and calls the stored power setting value to determine the driving voltage, and a power generator which applies the driving voltage based on the driving voltage determined by the controller.

14 Claims, 9 Drawing Sheets

(52) U.S. Cl.
CPC ......... *G09G 3/3688* (2013.01); *G09G 3/3696* (2013.01); *G09G 3/003* (2013.01); *G09G 2310/08* (2013.01); *G09G 2320/041* (2013.01); *G09G 2320/0673* (2013.01); *G09G 2320/0693* (2013.01); *G09G 2330/021* (2013.01); *G09G 2330/023* (2013.01)

(56) References Cited

U.S. PATENT DOCUMENTS

| | | | | |
|---|---|---|---|---|
| 8,410,715 | B2 | 4/2013 | Jeong et al. | |
| 9,728,138 | B2 | 8/2017 | Kim | |
| 9,892,670 | B2 | 2/2018 | Seo et al. | |
| 10,657,878 | B2 * | 5/2020 | Nam | G09G 3/3688 |
| 2009/0284515 | A1 * | 11/2009 | Tsuge | G09G 3/3233 345/211 |
| 2011/0084953 | A1 * | 4/2011 | Lee | G06F 1/3265 345/82 |
| 2011/0175895 | A1 * | 7/2011 | Hayakawa | G09G 3/36 345/212 |
| 2012/0113161 | A1 * | 5/2012 | Hong | H04N 13/337 345/690 |
| 2012/0257018 | A1 * | 10/2012 | Shigemura | G02B 30/27 348/46 |
| 2014/0210872 | A1 * | 7/2014 | Sasaki | G09G 3/3648 345/690 |
| 2014/0218539 | A1 * | 8/2014 | Matsui | H04N 9/30 348/179 |
| 2016/0042682 | A1 * | 2/2016 | Lim | G09G 3/2096 345/212 |
| 2016/0179179 | A1 * | 6/2016 | An | G06F 1/3296 345/212 |
| 2016/0351097 | A1 * | 12/2016 | Sato | G09G 3/344 |
| 2017/0061864 | A1 * | 3/2017 | Tang | G09G 3/2096 |
| 2017/0103725 | A1 * | 4/2017 | Seki | G09G 3/3696 |
| 2019/0244576 | A1 * | 8/2019 | Kwak | G09G 3/3655 |

FOREIGN PATENT DOCUMENTS

| | | | |
|---|---|---|---|
| KR | 1020130031102 | A | 3/2013 |
| KR | 101510882 | B1 | 4/2015 |
| KR | 20160119355 | A | 10/2016 |

* cited by examiner

Fig. 4

| 1st Memory Block(152) (2D optimum voltage) | |
|---|---|
| AVDD | 17V |
| HAVDD | 8.5V |
| VCOM | 6.5V |
| VGMA | 16.6V |
| ... | ... |
| VON | 31V |
| VOFF | -11.6V |
| VSS | -7.6V |

| 2nd Memory Block(153) (3D optimum voltage) | |
|---|---|
| AVDD | 19V |
| HAVDD | 8.5V |
| VCOM | 6V |
| VGMA | 16V |
| ... | ... |
| VON | 31V |
| VOFF | -11.6V |
| VSS | -7.6V |

| 3rd Memory Block(154) (Dynamic AVDD) | |
|---|---|
| AVDD | 14V |
| HAVDD | 7V |
| VCOM | 6.5V |
| VGMA | 13.5V |
| ... | ... |
| VON | 31V |
| VOFF | -11.6V |
| VSS | -7.6V |

| 4th Memory Block(155) (Dynamic VON/VOFF) | |
|---|---|
| AVDD | 17V |
| HAVDD | 8.5V |
| VCOM | 6.5V |
| VGMA | 16.6V |
| ... | ... |
| VON | 15V |
| VOFF | -10V |
| VSS | -6.0V |

POWER CONTROL CIRCUIT FOR DISPLAY DEVICE

This application is a continuation of U.S. patent application Ser. No. 15/827,395, filed on Nov. 30, 2017, which claims priority to Korean Patent Application No. 10-2016-0165142, filed on Dec. 6, 2016, and all the benefits accruing therefrom under 35 U.S.C. § 119, the content of which in its entirety is herein incorporated by reference.

1. FIELD

Exemplary embodiments of the invention relate to a display device including a power device which changes an output voltage in accordance with a change of an external environment.

2. DISCUSSION OF RELATED ART

Display devices display images using an element that emits light. In recent times, flat panel display ("FPD") devices are widely used. The FPD devices may be classified into liquid crystal display ("LCD") devices, organic light emitting diode ("OLED") display devices, plasma display panel ("PDP") devices and electrophoretic display devices, for example, based on a light emitting scheme thereof.

In general, a display device includes a gate driver for driving gate lines, a data driver for driving data lines, a timing controller ("T-CON") for controlling the gate driver and the data driver, and a power management integrated circuit ("PMIC") generating a driving voltage and a gamma voltage.

The driving voltage and the gamma voltage are output from the PMIC and applied to the data driver through a connection unit. In such an example, the driving voltage and the gamma voltage having an appropriate level are set in the PMIC in consideration of conditions such as a size of a display panel used in the manufacturing of the display device and an operating temperature.

In particular, according to the condition of a displayed image, when an image of a specific pattern such as a high power consumption image is displayed, the power consumption of the data driver is rapidly increased. In addition, in the case of a display panel including the gate driver formed on a substrate, an operating voltage of a transistor of the gate driver may be shifted in accordance with the operating temperature. In order to optimize the operation state of the data driver and the gate driver, the PMIC may detect a pattern of the displayed image and the operating temperature of the display device, and adjust the driving voltage and the gamma voltage in conjunction with the detected result.

SUMMARY

A plurality of memory banks which actively perform voltage management may be provided in the power management integrated circuit ("PMIC"). When a large number of voltage setting values are set to correspond to various operational conditions, the number of memory banks of the PMIC increases, leading to a problem that the number of wirings for an enable signal, a control signal for selecting the memory bank, also increases.

Exemplary embodiments of the invention may be directed to a display device including a power device capable of outputting an optimal driving voltage in accordance with a change in operating conditions of a display image and a surrounding environment of the display device.

According to an exemplary embodiment, a display device includes a display panel, a plurality of pixels arranged on the display panel, a data driver and a gate driver which respectively apply an image data signal and a gate pulse signal to the plurality of pixels, a timing controller which applies control signals respectively to the data driver and the gate driver, and a PMIC which applies a driving voltage to the data driver and the gate driver. The timing controller detects an operational condition of the display panel and selects one of a plurality of stored power setting values to output the selected one of the power setting values to the PMIC. The PMIC includes, a first storage bank, a second storage bank, a controller which receives the power setting value from the timing controller, stores the power setting value in one of the first storage bank and the second storage bank, and calls the stored power setting value to determine the driving voltage, and a power generator which applies the driving voltage based on the driving voltage determined by the controller.

In an exemplary embodiment, after calling all of the power setting values stored in said one of the first storage bank and the second storage bank, the controller may receive another power setting value from the timing controller and store said another power setting value in the other of the first storage bank and the second storage bank.

In an exemplary embodiment, the display device may further include a single-line enable signal and an inter-integrated circuit ("I2C") interface which connect the timing controller and the PMIC.

In an exemplary embodiment, the timing controller may transmit an optimal power setting value corresponding to the operational condition of the display panel to the PMIC through the I2C interface.

In an exemplary embodiment, the timing controller may switch an output state of the enable signal after the optimal power setting value is transmitted through the I2C interface.

In an exemplary embodiment, the power setting value may include at least one of a driving voltage of the display panel, a slope, a frequency, and a voltage transition time.

In an exemplary embodiment, the operational condition of the display panel may include at least one of an operating temperature, a two dimensional ("2D") screen display, a stereoscopic screen display, a high power consumption image display, and a display image pattern.

In an exemplary embodiment, the timing controller may include a plurality of memory blocks including optimal power setting values which differ from one another depending on the operational condition of the display panel.

In an exemplary embodiment, the timing controller may be connected to the PMIC only through an I2C interface, and the PMIC may further include an enable register selecting the storage bank storage bank or the second storage bank.

In an exemplary embodiment, the timing controller may transmit a power setting value corresponding to the operational condition of the display panel and a digital code to select the first storage bank or the second storage bank to the PMIC through the I2C interface.

In an exemplary embodiment, the digital code may be one bit of 0 or 1.

According to an exemplary embodiment, a method of driving a display device includes referring to, by a PMIC, a stored initial power setting value and storing the initial power setting value in a first storage bank in an initial driving of the display device, outputting, by the PMIC, a driving voltage corresponding to the initial power setting value, detecting, by a timing controller, an input image or a temperature to sense an operational condition of the display device, referring to, by the timing controller, an optimal power setting value corresponding to the operational condition of the display device from a stored table, transmitting, by the timing controller, the optimal power setting value to the PMIC, storing, by the PMIC, the optimal power setting value in a second storage bank, referring to, by the PMIC, the optimal power setting value stored in the second storage bank, and adjusting, by the PMIC, an output to a driving voltage corresponding to the optimal power setting value.

In an exemplary embodiment, the transmitting, by the timing controller, the optimal power setting value to the PMIC may include transmitting, by the timing controller, the optimal power setting value through an I2C interface.

In an exemplary embodiment, the timing controller may further output an enable signal which notifies that the transmission of the optimal power setting value is completed, and the PMIC may detect a change of the enable signal and refer to the optimal power setting value stored in the second storage bank.

In an exemplary embodiment, the timing controller may transmit a digital code to select the first storage bank or the second storage bank through an I2C interface, and the PMIC may store the digital code in an enable registry and refer to the power setting value from the storage bank that corresponds to the digital code.

In an exemplary embodiment, the operational condition of the display device may include at least one of a 2D image display, a three dimensional ("3D") stereoscopic image display, a high power consumption image display, and a driving temperature of the display device.

In an exemplary embodiment, when the PMIC adjusts the output to the driving voltage corresponding to the optimal power setting value, a variation slope of the driving voltage may be less than about 100 millivolt per second (mV/s).

The foregoing is illustrative only and is not intended to be in any way limiting. In addition to the illustrative exemplary embodiments and features described above, further exemplary embodiments and features will become apparent by reference to the drawings and the following detailed description.

BRIEF DESCRIPTION OF THE DRAWINGS

A more complete appreciation of the invention will become more apparent by describing in detail exemplary embodiments thereof with reference to the accompanying drawings, in which:

FIG. 4 is an exemplary diagram illustrating a look-up table including power setting values;

DETAILED DESCRIPTION

Figure 1:
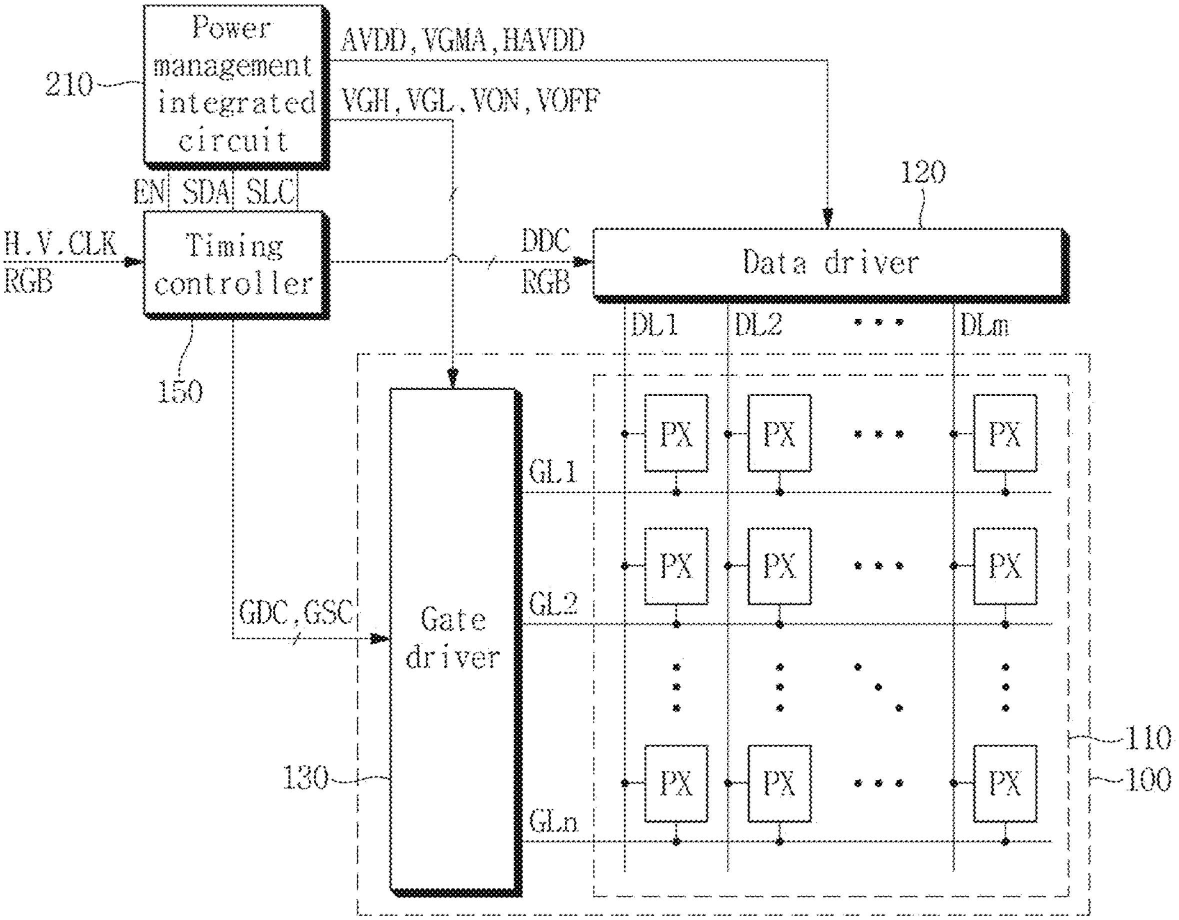
FIG. 1 is a configuration diagram illustrating an exemplary embodiment of a display device.

Exemplary embodiments will now be described more fully hereinafter with reference to the accompanying drawings. Although the invention may be modified in various manners and have several exemplary embodiments, exemplary embodiments are illustrated in the accompanying drawings and will be mainly described in the specification. However, the scope of the invention is not limited to the exemplary embodiments and should be construed as including all the changes, equivalents and substitutions included in the spirit and scope of the invention.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below," "beneath," "lower," "above," "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "including," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Some of the parts which are not associated with the description may not be provided in order to specifically describe embodiments of the invention and like reference numerals refer to like elements throughout the specification.

FIG. 1 is a configuration diagram illustrating a display device according to an exemplary embodiment.

As illustrated in FIG. 1, the display device according to an exemplary embodiment includes a display panel 100, a pixel area 110, a data driver 120, a gate driver 130, a timing controller 150 and a power management integrated circuit ("PMIC") (also referred to as a power management circuit unit) 210.

Although not illustrated, in the case where the display panel 100 is a liquid crystal display ("LCD") panel, an LCD device including the display panel 100 may further include a backlight unit (not illustrated) providing a light to the display panel 100 and a pair of polarizers (not illustrated). In addition, the LCD panel may be in one of a vertical alignment ("VA") mode, a patterned vertical alignment ("PVA") mode, an in-plane switching ("IPS") mode, a fringe-field switching ("FFS") mode and a plane to line switching ("PLS") mode, for example, but is not limited to panels of a particular mode.

The display panel 100 includes a plurality of gate lines GL1 to GLn, a plurality of data lines DL1 to DLm insulated from and crossing the plurality of gate lines GL1 to GLn, and a plurality of pixels PX electrically connected to the plurality of gate lines GL1 to GLn and the plurality of data lines DL1 to DLm where n and m are natural numbers. The plurality of gate lines GL1 to GLn are connected to the gate driver 130 and the plurality of data lines DL1 to DLm are connected to the data driver 120.

The data driver 120 includes a plurality of data driving integrated circuits ("integrated circuits") (not illustrated). The data driving ICs may include thin film transistors ("TFTs") and may be disposed (e.g., mounted) directly on the display panel 100. The data driver 120 receives digital image data signals RGB and a data driving control signal DDC from the timing controller 150. The data driver 120 samples the digital image data signals RGB according to the data driving control signal DDC, then latches the sampled image data signals corresponding to one horizontal line in each horizontal period, and applies the latched image data signals to the data lines DL1 to DLm.

The gate driver 130 receives a gate on voltage VON, a gate off voltage VOFF and gate driving voltages VGH and VGL from the PMIC 210 and receives a gate driving control signal GDC and a gate shift clock GSC from the timing controller 150. The gate driver 130 sequentially generates gate pulse signals in response to the gate driving control signal GDC and the gate shift clock GSC and applies the gate pulse signals to the gate lines GL1 to GLn.

The timing controller 150 applies the digital image data signals RGB externally applied thereto to the data driver 120. Further, the timing controller 150 generates the data driving control signal DDC and the gate driving control signal GDC according to a clock signal CLK using a horizontal synchronization signal H and a vertical synchronization signal V and applies the data driving control signal DDC to the data driver 120 and the gate driving control signal GDC to the gate driver 130. In such an exemplary embodiment, the data driving control signal DDC may include a source shift clock, a source start pulse, a data output enable signal, or the like, and the gate driving control signal GDC may include a gate start pulse, a gate output enable signal, or the like.

The PMIC 210 applies, to the data driver 120, an analog driving voltage AVDD and a gamma voltage VGMA, which are reference voltages for converting an image signal. The data driver 120 receives the analog driving voltage AVDD and the gamma voltage VGMA from the PMIC 210, receives the digital image data signals RGB from the timing controller 150, and then converts the digital image data signals RGB into analog image data signals to apply the analog image data signals to the data lines DL1 to DLm.

Figure 2:
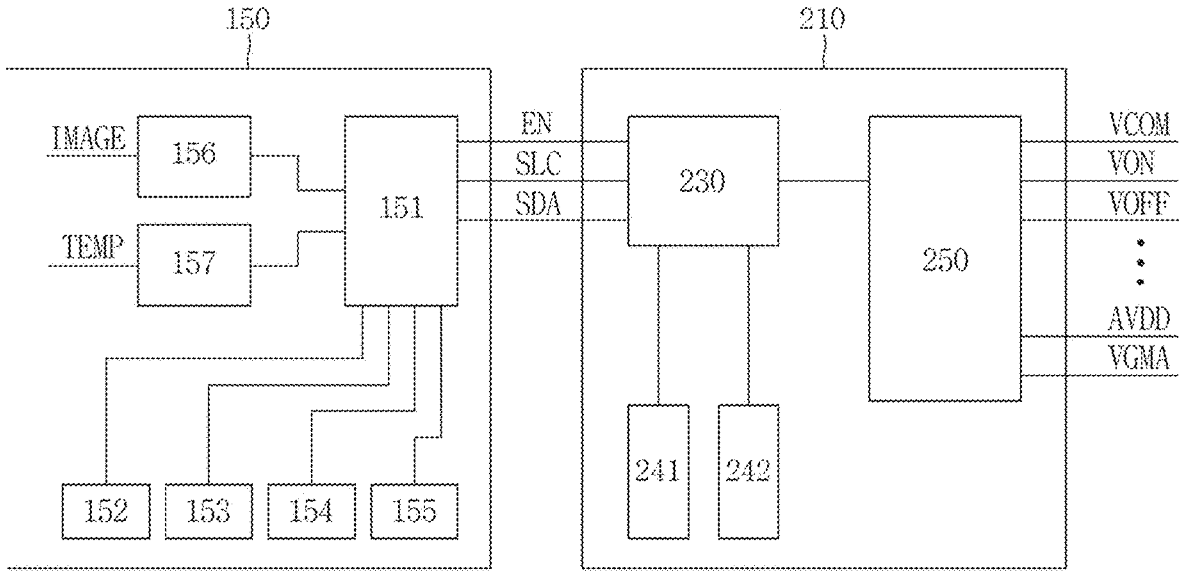
FIG. 2 is a configuration diagram illustrating an exemplary embodiment of a power management integrated circuit ("PMIC")

FIG. 2 is a configuration diagram illustrating a PMIC according to an exemplary embodiment.

Referring to FIG. 2, the timing controller 150 includes an interface communication unit 151, a first memory block 152, a second memory block 153, a third memory block 154, a fourth memory block 155, an image pattern detector 156 and a temperature detector 157. The image pattern detector 156 detects a pattern of an input image IMAGE to detect operational conditions of the image displayed on the display panel 100 such as a three dimensional ("3D") stereoscopic image display and a power consumption increase pattern. The temperature detector 157 detects a driving temperature TEMP of the display device. The operational conditions of the display device may be comprehensively detected through the use of the image pattern detector 156 and the temperature detector 157.

The first, second, third and fourth memory blocks 152, 153, 154 and 155 include optimal power setting values depending on the operational conditions of the display device. The memory block may include optimal power setting values in the form of a look-up table ("LUT"). An output voltage of the driving power output from the PMIC 210 is controlled by the power setting value. A memory block that includes an optimal power setting value for the detected operational conditions such as the input image condition or a change in the temperature may be selected and an erroneous driving of the display device may be compensated by changing the output voltage of the driving power.

Referring to FIG. 2, the PMIC 210 includes a controller 230, a first storage bank 241, a second storage bank 242 and a power generator 250.

The controller 230 is connected to the timing controller 150 through an inter-integrated circuit ("I2C") interface and an enable signal EN. The I2C interface is a signal transmission interface which transmits and receives data through two lines of a serial clock ("SLC") signal line and a serial data ("SDA") signal line. The I2C interface, which is a serial communication interface, synchronizes a clock through the SLC signal line and performs data input and/or output through the SDA signal line. Two-way communication is impossible at a time because the data transmission and reception are performed through only a single line, and the transmission speed is possible from about 100 kilohertz (kHz) to about 400 kHz, for example. The enable signal EN maintains a low state or a high state by a connection wiring of a single line. In an exemplary embodiment, the state of the enable signal EN may correspond to a 1-bit digital code, for example. When all data of the power setting value are transmitted from the timing controller 150 through the I2C interface, the state information of the enable signal EN is switched. The PMIC 210 switches the memory bank in which the power setting value is stored according to the change of the state of the enable signal EN.

The controller 230 calls the power setting values stored in the memory blocks 152, 153, 154 and 155 of the timing controller 150 and stores the power setting values in an inactive storage bank of the first storage bank 241 and the second storage bank 242. As used herein, an active storage bank refers to a storage bank which stores an existing power setting value corresponding to the driving voltage currently being output from the power generator 250, and an inactive storage bank refers to any other storage bank that is not the active storage bank.

In an exemplary embodiment, in the case where the power generator 250 is outputting a voltage of the driving power at the power setting value stored in the first storage bank 241, the active storage bank is the first storage bank 241, for example. The controller 230 stores the received power setting value in the second storage bank 242 which is the inactive storage bank. When the storage of the power setting value in the second storage bank 242 is completed, the controller 230 toggles and switches the output state of the enable signal EN. That is, the enable signal EN is converted into a low state from a high state and converted into a high state from a low state. As the state changes, a rising edge or a falling edge is generated in the enable signal EN. The controller 230 changes the active storage bank from the first storage bank 241 to the second storage bank 242 when the rising edge or the falling edge is detected in the enable signal EN. The controller 230 calls the power setting value from the second storage bank 242 in which the power setting value received from the timing controller 150 is stored to determine the driving voltage. The power generator 250 applies the driving voltage to the data driver 120 and the gate driver 130 based on the driving voltage determined by the controller 230.

The first storage bank 241 may store an initial power setting value applied at an initial operation state of the display device and the power setting value received from the timing controller 150. In an exemplary embodiment, the first storage bank 241 may include an erasable programmable read-only memory ("EPROM") or an electrically erasable programmable read-only memory ("EEPROM") which is easy to store data and of which data is not deleted after the power is turned off, for example. In the case where the first storage bank 241 is configured as a random-access memory ("RAM"), the initial power setting value is stored in a separate ROM and may be uploaded to the first storage bank 241 immediately after the turn-on.

The power generator 250 determines an output value of the driving voltage by referring to the power setting value stored in the storage bank. The power generator 250 generates a power applied to the display panel, such as a gate on voltage VON, a gate off voltage VOFF, an analog driving voltage AVDD, an analog driving high voltage HAVDD (refer to FIG. 1), a gamma voltage VGMA, a common voltage VCOM, gate driving voltages VGH (refer to FIG. 1) and VGL (refer to FIG. 1), and the like.

Figure 3A:
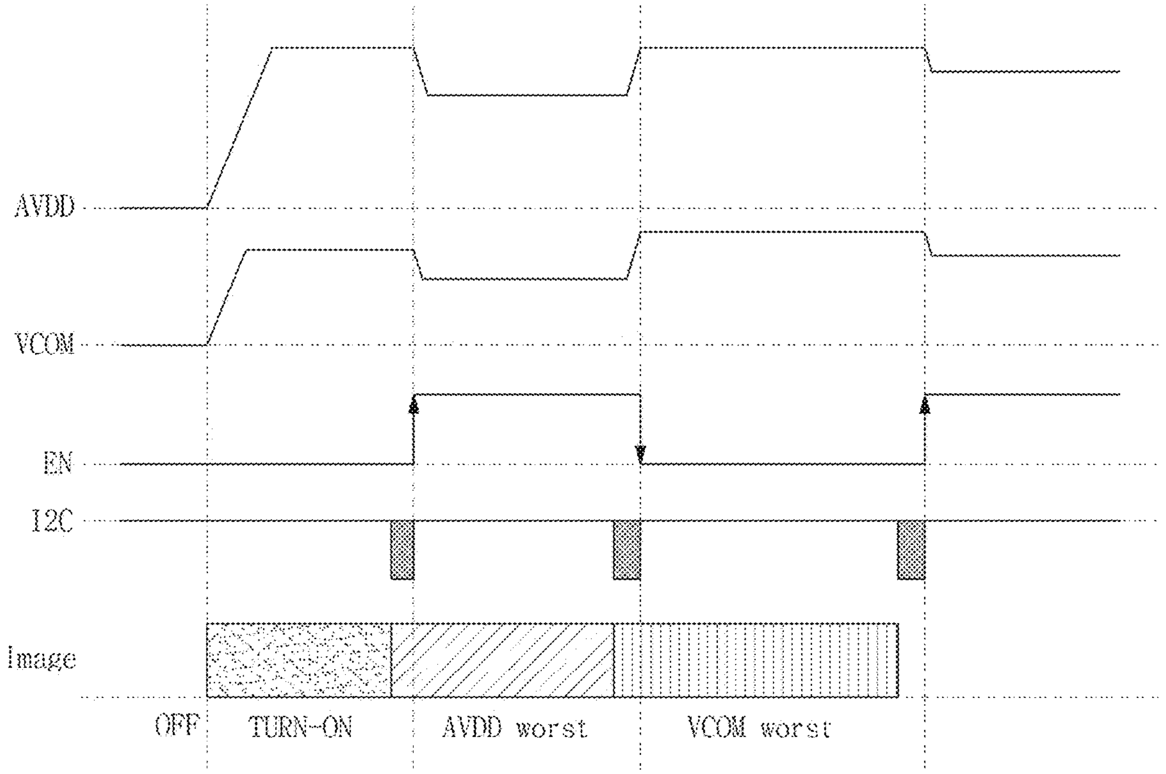
FIGS. 3A and 3B are exemplary diagrams illustrating an exemplary embodiment of control of an output driving voltage.
Figure 3B:
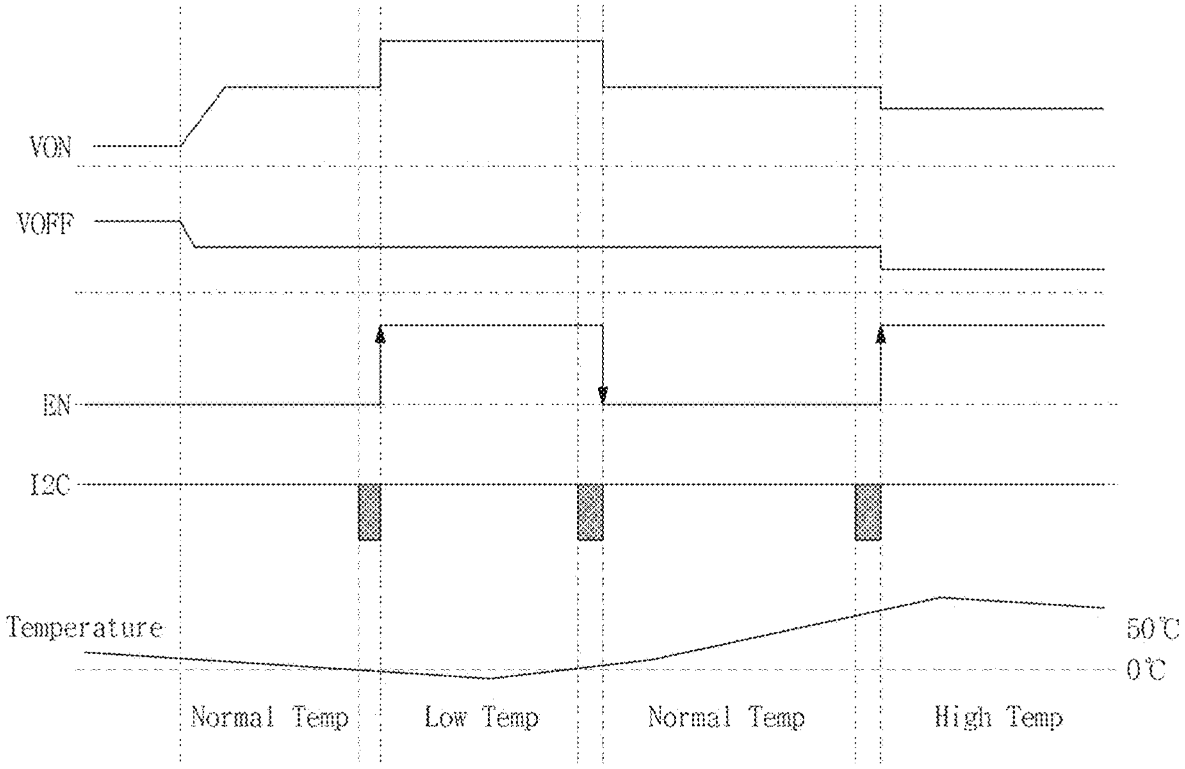

FIGS. 3A and 3B are exemplary diagrams illustrating control of an output driving voltage according to an exemplary embodiment.

Examples of the operational conditions of the display device may include an operating temperature, an input condition of a two dimensional ("2D") image and a three dimensional ("3D") stereoscopic image, and an image pattern condition which may affect the operation state of the display panel.

In an exemplary embodiment, in the case of an LCD device, a display image may appear differently depending on the temperature of the use environment, for example. The display image appears blackish when the temperature is higher than the room temperature, and the display image appears whitish when the temperature is lower than the room temperature. This phenomenon of image distortion is caused by a change of a liquid crystal charging ratio due to changes of operational characteristics depending on the temperature of a TFT. At relatively low temperature, the operational characteristics of the TFT are degraded, and the charging ratio of the liquid crystal decreases. On the contrary, at relatively high temperature, the operational characteristics of the TFT are exceedingly improved, and the charging ratio of the liquid crystal exceeds. As an example of methods for compensating for such characteristics, the operation voltage of a gate power may be set to be lower than that at room temperature.

As another example, the optimal power setting value is different between cases when the display device displays a 2D image and a 3D stereoscopic image. When a 3D stereoscopic image is displayed, the display device alternately displays a left eye image and a right eye image at a high frame rate. In order to realize a high frame rate, the common voltage VCOM which affects the entire liquid crystal element may be increased and/or the gamma voltage VGMA for displaying a grey level may also be set high. In addition, different voltage levels may be set for respective voltages, and a magnitude of the voltage may be set differently according to the structure of the display panel and the operational conditions.

As another operational condition, a pattern of an input image may be detected. In the case where the display device is an LCD device, the display panel is influenced by a specific image pattern. In an exemplary embodiment, in the case where a black-and-white horizontal stripe repeating image signal is input, the power consumption may be rapidly increased depending on the driving condition and the condition of the image input signal, for example. When the power consumption is expected to increase by analyzing the pattern of the input image, the voltage level of the analog driving voltage AVDD is set relatively low to decrease a voltage width of a data driving pulse, thereby substantially preventing an increase of the power consumption.

Referring to FIG. 3A, the analog driving voltage AVDD, the common voltage VCOM, and the enable signal EN, which are output voltages in an initial off state OFF of the display device, maintain an electric potential of 0.

When the display device is turned on, an image is externally input, and a driving power such as the analog driving voltage AVDD and the common voltage VCOM is applied based on the determined voltage value. In an initial turn-on operation, an output value of the driving voltage may refer to the initial power setting value stored in the first storage bank 241 (refer to FIG. 2) of the PMIC 210 (refer to FIG. 2). Although the analog driving voltage AVDD and the common voltage VCOM are only exemplified in FIG. 3A, it should be understood that all of the other power voltages are also output.

Referring to FIG. 3A, in the case where the operational condition of the display device changes, the timing controller 150 (refer to FIG. 2) transmits the optimal power setting value to the PMIC 210 through the I2C interface, for example. In an exemplary embodiment, the input image may be a high power consumption image which acts as a large load on the analog driving voltage AVDD or the common voltage VCOM, for example. The power setting value may be set relatively low so that the power consumption may be reduced. After the transmission of the power setting value is completed, the timing controller 150 toggles and switches the state of the enable signal EN, and the PMIC 210 which receives the enable signal EN receives an output power and changes it to an updated power setting value.

Referring to FIG. 3B, the operating temperature of the display device may continuously change to become a low temperature condition of about 0 degrees Celsius (° C.) or less or a high temperature condition of about 50° C. or more, for example. The timing controller 150 transmits the optimal power setting value to the PMIC 210 through the I2C interface. When the transmission of the power setting value is completed, the timing controller 150 toggles and switches the state of the enable signal EN and correspondingly, the PMIC 210 changes the output power to the transmitted power setting value. Although the control state of the gate on voltage VON and the gate off voltage VOFF applied to the gate driver 130 which affect the temperature characteristics are only illustrated in FIG. 3B by way of example, it should be understood that other driving voltages may be also changed.

FIG. 4 is an exemplary diagram illustrating an LUT including power setting values.

Referring to FIG. 4, the timing controller 150 includes at least two voltage LUTs including power setting values for each operational condition.

Referring to FIGS. 2 and 4, the first memory block 152 includes power setting values of the analog driving voltage AVDD, the analog driving high voltage HAVDD, the common voltage VCOM, the gamma voltage VGMA, the gate on voltage VON, the gate off voltage VOFF and the low electric potential voltage VSS when the operational condition of the display panel is displaying a normal 2D image.

That is, the first memory block 152 includes the power setting values of the analog driving voltage AVDD, the analog driving high voltage HAVDD, the common voltage VCOM, the gamma voltage VGMA, the gate on voltage VON, the gate off voltage VOFF and the low electric potential voltage VSS in a state where a normal 2D image is input. The first memory block 152 stores the power setting value substantially equal to the initial power setting value stored in the first storage bank 241 of the PMIC 210.

The second memory block 153 stores power setting values of the analog driving voltage AVDD, the analog driving high voltage HAVDD, the common voltage VCOM, the gamma voltage VGMA, the gate on voltage VON, the gate off voltage VOFF and the low electric potential voltage VSS when a 3D stereoscopic image is displayed on the display panel. The condition of the second memory block 153 sets the analog driving voltage AVDD rather higher in accordance with an increase of a driving rate of the display panel.

The third memory block 154 stores power setting values of the analog driving voltage AVDD, the analog driving high voltage HAVDD, the common voltage VCOM, the gamma voltage VGMA, the gate on voltage VON, the gate off voltage VOFF and the low electric potential voltage VSS when the analog driving voltage AVDD is controlled on the display screen with a large power consumption. The condition of the third memory block 154 sets the analog driving voltage AVDD and the gamma voltage VGMA to be relatively low in order to reduce the power consumption of the display screen.

The fourth memory block 155 stores power setting values of the analog driving voltage AVDD, the analog driving high voltage HAVDD, the common voltage VCOM, the gamma voltage VGMA, the gate on voltage VON, the gate off voltage VOFF and the low electric potential voltage VSS when the characteristics of a driving circuit of the pixel are changed at high temperature. The condition of the fourth memory block 155 sets the gate on voltage VON to be relatively low in consideration of the change of the operating characteristics of a pixel transistor.

Although FIG. 4 only illustrates the power setting values for the above four conditions for convenience of explanation, various voltage conditions are possible depending on the characteristics and the use environment of the display device. In addition, the power setting value includes a driving voltage and a voltage transition time Ttr (refer to FIG. 7B). The voltage transition time Ttr may substantially prevent the driving voltage of the display device from being abruptly changed when the power setting value is changed due to the change of the operational condition.

Figure 5A:
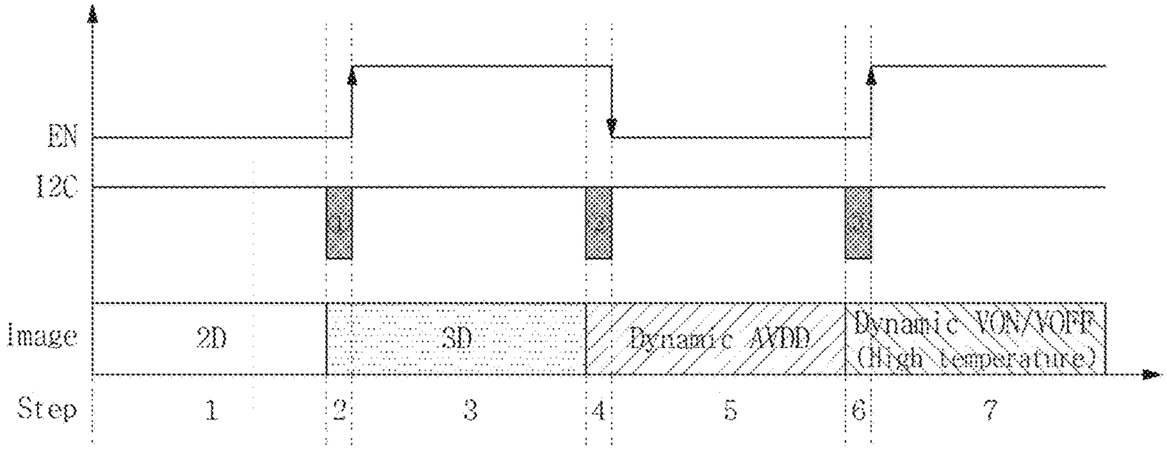
FIG. 5A is an operation waveform diagram updating a stored power setting value.

FIG. 5A is an operation waveform diagram updating a stored power setting value.

Figure 5B:
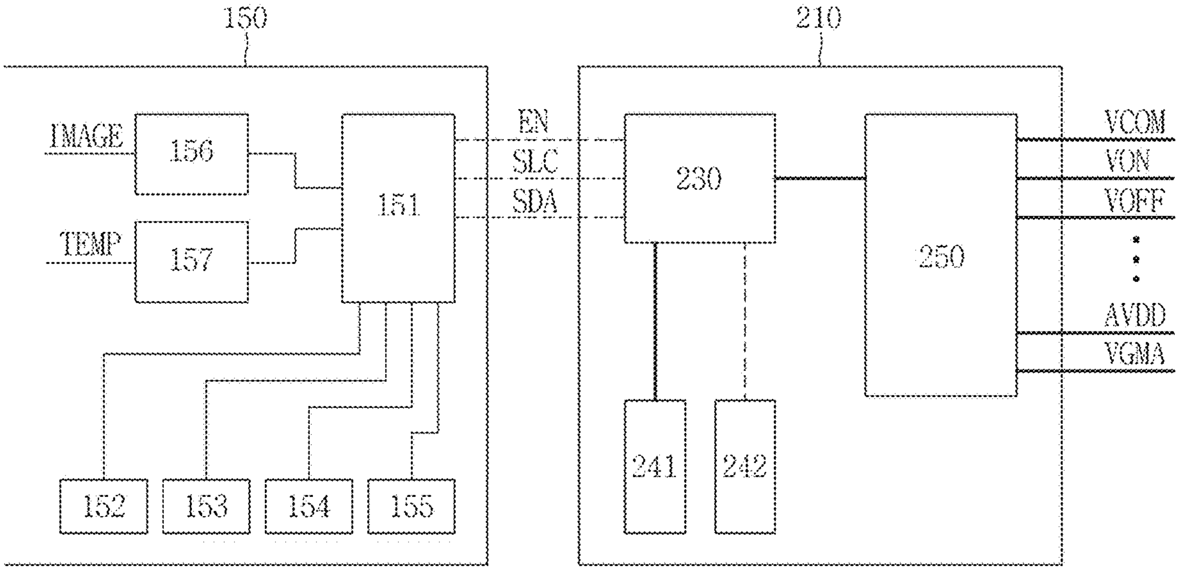
FIG. 5B is an operation state diagram of a timing controller and a PMIC in a first section.

FIG. 5B is an operation state diagram of the timing controller 150 and the PMIC 210 in a first section 1 of FIG. 5A.

Referring to FIGS. 5A and 5B, the display device displays a normal 2D screen in the first section 1. The first section 1 is an initial startup phase after a turn-on operation. In the first section 1, the image pattern detector 156 detects a pattern of an input image IMAGE, and the temperature detector 157 detects a driving temperature TEMP of the display device. However, in the initial operation state, the operational conditions of the image pattern detector 156 and the temperature detector 157 are not reflected.

The controller 230 of the PMIC 210 calls the initial power setting value stored in the first storage bank 241. The controller 230 determines the driving voltage to be output based on the called power setting value in the power generator 250.

Figure 5C:
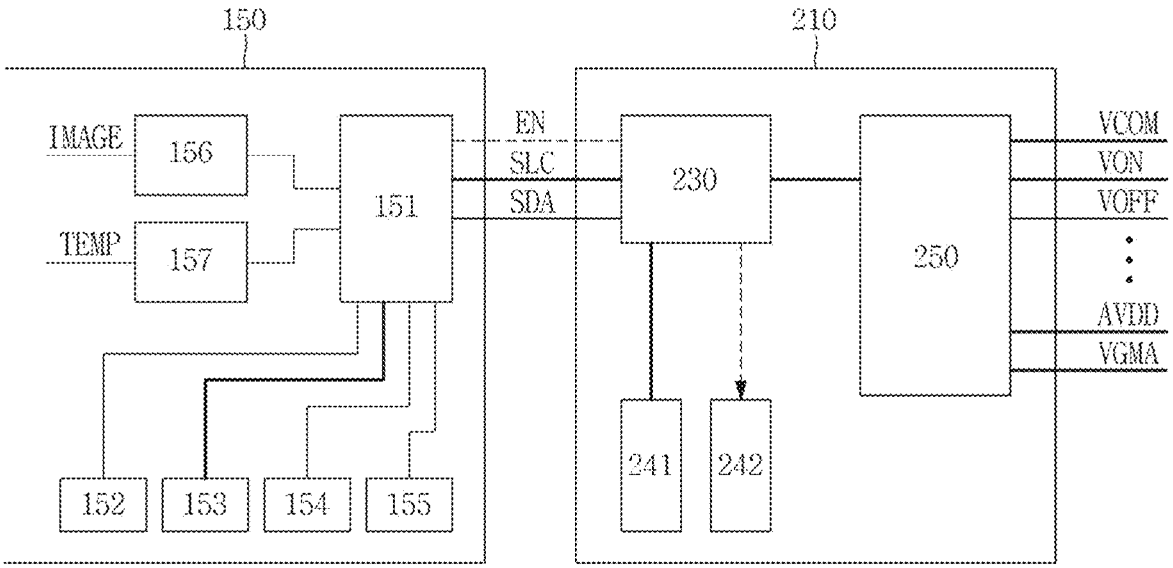
FIG. 5C is an operation state diagram of the timing controller and the PMIC in a second section.

FIG. 5C is an operation state diagram of the timing controller 150 and the PMIC 210 in a second section 2 of FIG. 5A.

Figure 5D:
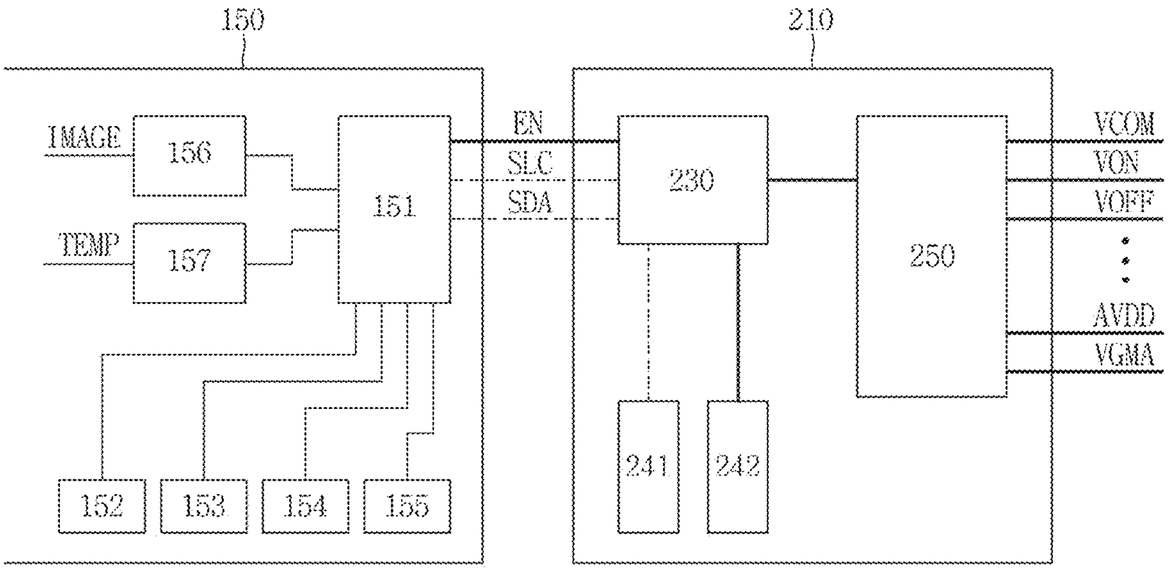
FIG. 5D is an operation state diagram of the timing controller and the PMIC in a third section.

FIG. 5D is an operation state diagram of the timing controller 150 and the PMIC 210 in a third section 3 of FIG. 5A.

Referring to FIGS. 5A and 5C, the display device receives and displays a 3D stereoscopic image in the second section 2. The timing controller 150 calls an optimal power setting value for displaying the 3D stereoscopic image from the second memory block 153. The interface communication unit 151 transmits the power setting value of the second memory block 153 to the PMIC 210 through the I2C interface. The controller 230 of the PMIC 210 stores the received power setting value in the second storage bank 242 which is the inactive storage bank.

Referring to FIGS. 5A and 5D, after transmitting all of the power setting values of the second memory block 153, the timing controller 150 converts a low state of the enable signal EN to a high state in an initial stage of the third section 3. The controller 230 of the PMIC 210 designates the second storage bank 242, which is the inactive storage bank, as the active bank when a rising edge due to the transition of the enable signal EN is detected. The power setting value stored in the second storage bank 242 is a value set optimally for displaying the 3D stereoscopic image. The power generator 250 changes an output value of the driving voltage so as to correspond to the power setting value of the second storage bank 242. While the display device is in operation, the change of the output value of the driving power may instantaneously change a luminance of the display panel to be recognized by a user. In order to substantially prevent this, the power setting value may include a voltage transition time. The voltage transition time Ttr (refer to FIG. 7B) is a value of time it takes to convert a current output voltage to an adjusted voltage value. In an exemplary embodiment, the voltage transition time Ttr may be determined according to a variation width of the voltage, and it is desirable that a slope of the voltage be less than about 100 millivolts per second (mV/s), for example.

Figure 5E:
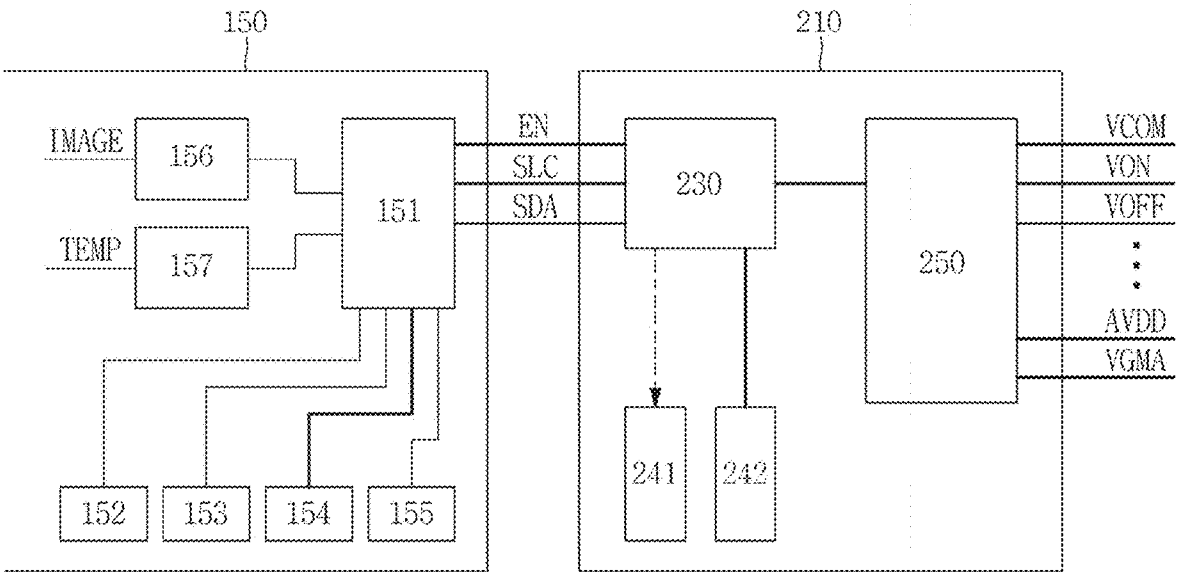
FIG. 5E is an operation state diagram of the timing controller and the PMIC in a fourth section.

FIG. 5E is an operation state diagram of the timing controller 150 and the PMIC 210 in a fourth section 4 of FIG. 5A.

Figure 5F:
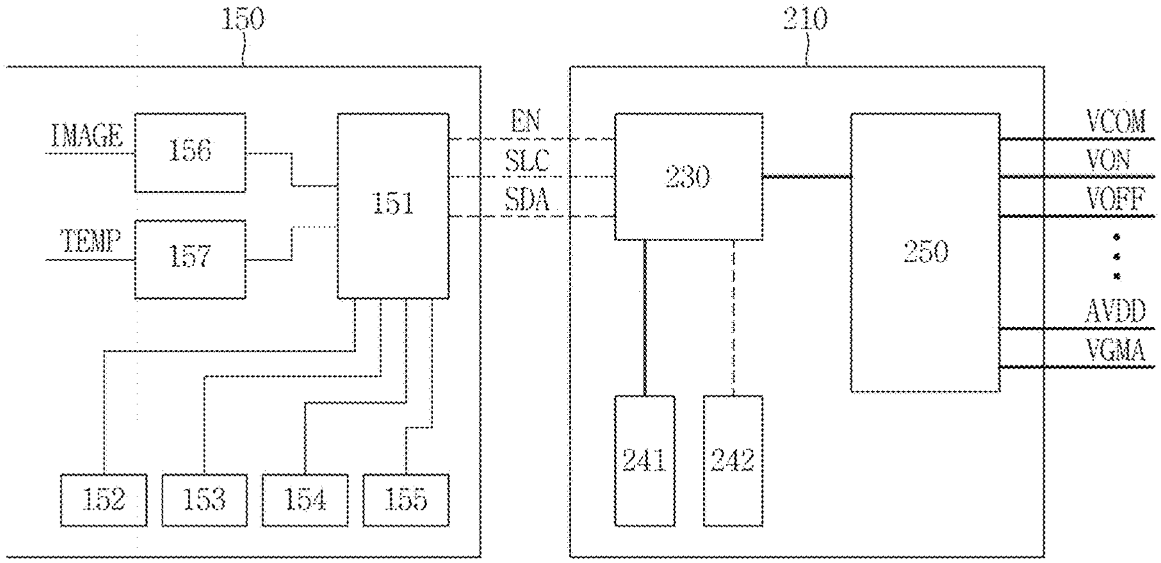
FIG. 5F is an operation state diagram of the timing controller and the PMIC in a fifth section.

FIG. 5F is an operation state diagram of the timing controller 150 and the PMIC 210 in a fifth section 5 of FIG. 5A.

Referring to FIGS. 5A and 5E, the display device displays a high power consumption image. The timing controller 150 calls an optimal power setting value for displaying the high power consumption image from the third memory block 154. The interface communication unit 151 transmits the power setting value of the third memory block 154 to the PMIC 210 through the I2C interface. The controller 230 of the PMIC 210 stores the received power setting value in the first storage bank 241 which is in the inactive state.

Referring to FIGS. 5A and 5F, after transmitting all of the power setting values of the third memory block 154, the timing controller 150 converts the high state of the enable signal EN to a low state in an initial stage of the fifth section 5. When detecting a falling edge due to the transition of the enable signal EN, the controller 230 of the PMIC 210 designates the first storage bank 241 as the active storage bank and designates the second storage bank 242 as the inactive storage bank. The power setting value stored in the first storage bank 241 is a voltage value set to lower the analog driving voltage AVDD to reduce power consumption. The power generator 250 outputs a driving voltage corresponding to the power setting value of the first storage bank 241.

Figure 6:
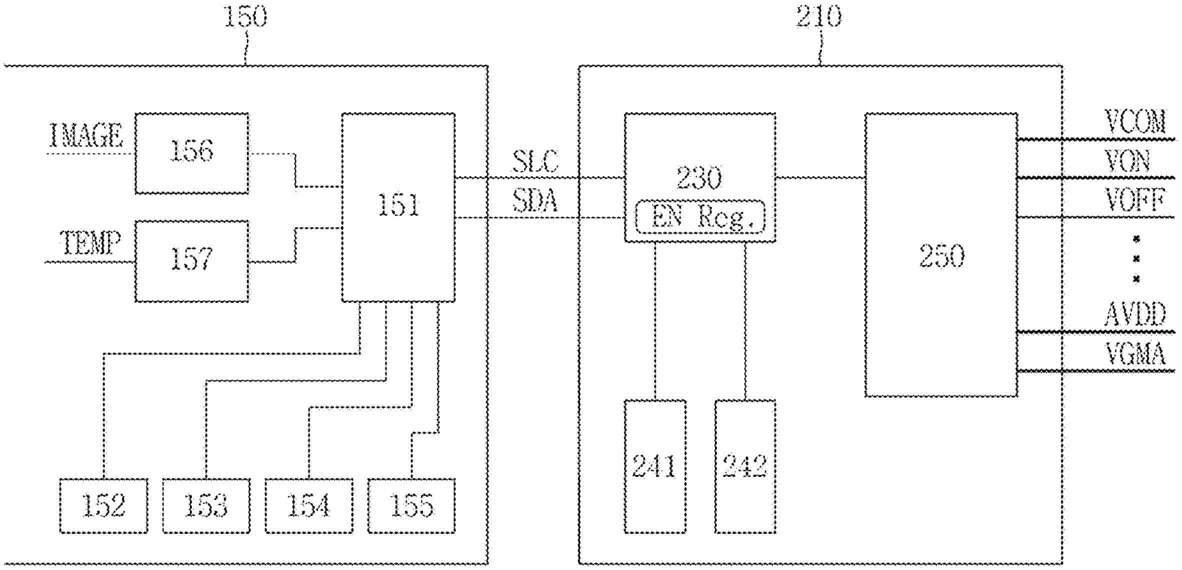
FIG. 6 is a configuration diagram illustrating an alternative exemplary embodiment of a PMIC.

FIG. 6 is a configuration diagram illustrating a power management circuit according to an alternative exemplary embodiment.

Referring to FIG. 6, a timing controller 150 includes an interface communication unit 151, a first memory block 152, a second memory block 153, a third memory block 154, a fourth memory block 155, an image pattern detector 156 and a temperature detector 157.

A PMIC 210 includes a controller 230, a first storage bank 241, a second storage bank 242, and a power generator 250. The controller 230 is connected to the timing controller 150 through an I2C interface. The I2C interface is a serial communication interface that synchronizes a clock through an SLC signal line and performs data input and/or output through an SDA signal line. The controller 230 includes an enable register EN Reg.

The controller 230 receives a power setting value from the timing controller 150. In addition, the controller 230 receives a setting value of the enable register EN Reg. The enable register EN Reg includes a control signal value for activating one of the first storage bank 241 and the second storage bank 242 of the PMIC 210. The enable register EN Reg may be generated by the interface communication unit 151.

In an exemplary embodiment, when the first storage bank 241 is activated, the PMIC 210 stores the power setting value, received through the I2C interface, in the second storage bank 242 which is not activated, for example. The interface communication unit 151 transmits all of the power setting values and then transmits information of the enable register EN Reg. In an exemplary embodiment, the information of the enable register EN Reg may simply be a bit information of '0' and '1', for example. In the case where a previously transmitted value of the enable register EN Reg is '0,' the interface communication unit 151 may transmit a value of '1' to deactivate the first storage bank 241 and activate the second storage bank 242. Further, in the case where the previously transmitted value of the enable register EN Reg is '1,' the interface communication unit 151 may transmit a value of '0.' However, the invention is not limited thereto, and the information of the enable register EN Reg may include various other values.

The power management circuit unit 210 according to the illustrated exemplary embodiment includes two storage banks 241 and 242, and thus the storage bank may be selected with a bit-by-bit digital code.

Figure 7A:
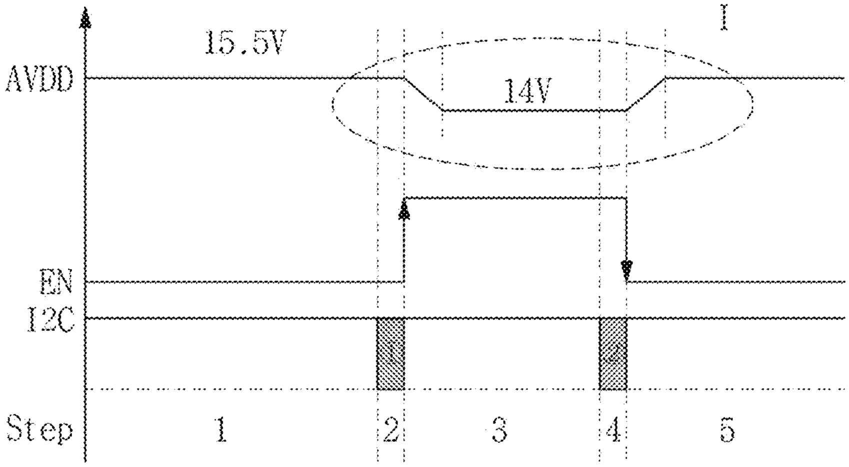
FIG. 7A is a waveform diagram illustrating an analog driving voltage.

FIG. 7A is a waveform diagram illustrating an analog driving voltage.

Figure 7B:
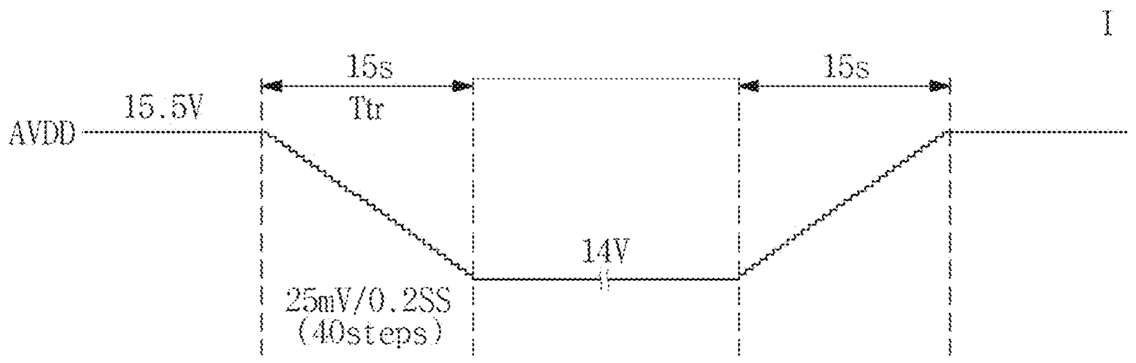
FIG. 7B is a waveform diagram illustrating an analog driving voltage obtained by enlarging an area I of FIG. 7A.

FIG. 7B is a waveform diagram illustrating the analog driving voltage obtained by enlarging an area I of FIG. 7A.

Referring to FIGS. 7A and 7B, a first section is a section for displaying a general input image on a screen. A second section is a section immediately after a high power consumption image is input to the display device. The timing controller 150 (refer to FIG. 6) determines whether an input image is a high power consumption image through the use of the image pattern detector 156 (refer to FIG. 6) and then transmits, to the interface communication unit 151 (refer to FIG. 6), a power setting value in which the analog driving voltage AVDD is set relatively low. After transmission of all of the power setting values is completed, the timing controller 150 converts a low state of the enable signal EN to a high state and outputs the enable signal EN in an initial stage of a third section. After detecting a rising edge of the enable signal EN, the PMIC 210 changes the driving voltage to an updated power setting value. The power setting value includes a voltage transition time Ttr. The voltage transition time Ttr is a transition time for substantially preventing the output driving voltage from being abruptly changed. In the case where the driving voltage of the display device is changed instantaneously, flickering may be generated in an output image. The voltage transition time Ttr is set to a value of several seconds or more to substantially prevent the abrupt change of the driving voltage. The voltage transition time Ttr may be set in consideration of a deviation of the driving voltage to be changed. It is desirable that the voltage transition time Ttr according to an exemplary embodiment be set so that a variation slope of the driving voltage is about 100 mV/s, for example. In the case where a voltage of about 1.5 V (e.g., from 15.5 V to 14 V) is changed as illustrated in FIG. 7B, it is preferable that the voltage transition time Ttr be about 15 seconds, for example.

Figure 8:
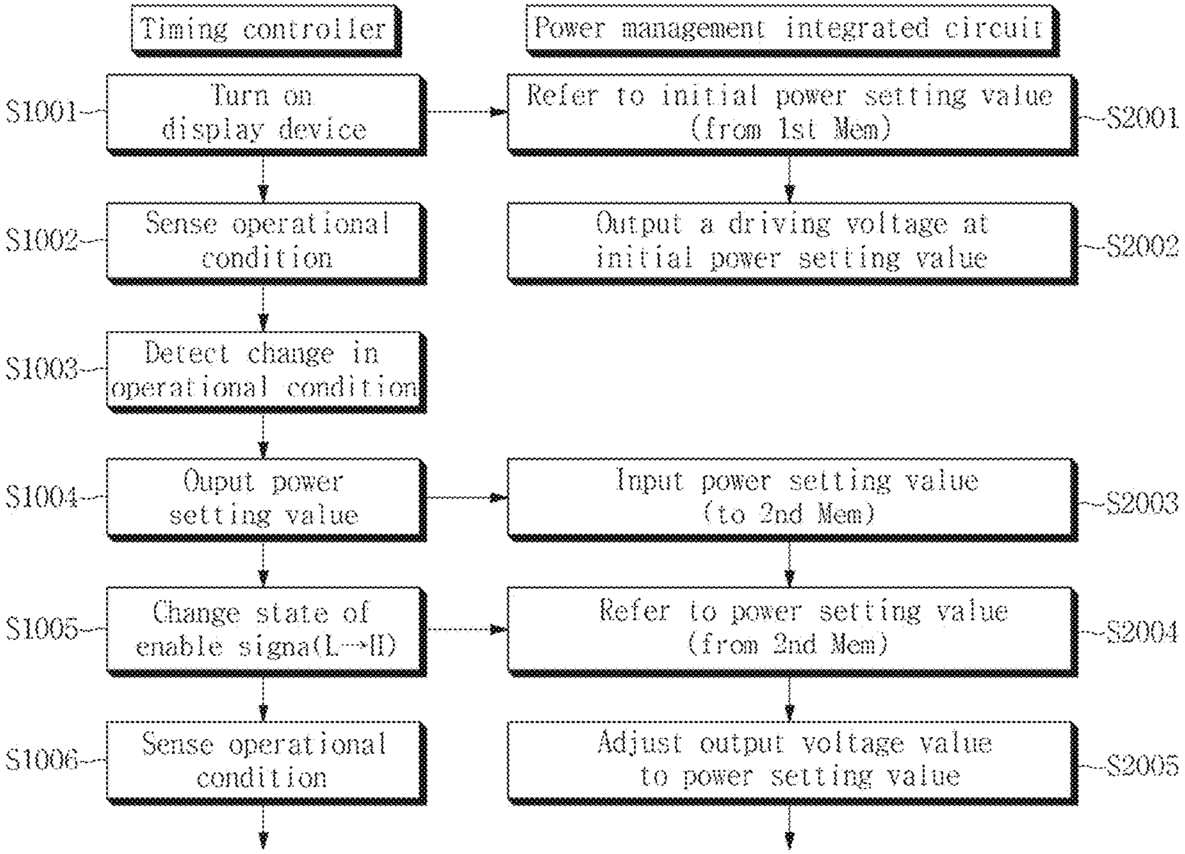
FIG. 8 is an operation flowchart of an exemplary embodiment of a PMIC.

FIG. 8 is an operation flowchart of the PMIC according to an exemplary embodiment.

Referring to FIGS. 2, 5B to 6 and 8, when the display device is turned on, the timing controller 150 controls the PMIC 210 to output a power (S1001).

The PMIC 210 refers to an initial power setting value stored in the first storage bank 241 (S2001). The power generator 250 of the PMIC 210 generates a voltage corresponding to the initial power setting value and outputs the generated voltage as a driving voltage (S2002). The driving voltage may include an analog driving voltage AVDD, an analog driving high voltage HAVDD, a common voltage VCOM, a gamma voltage VGMA, a gate on voltage VON, a gate off voltage VOFF, a low electric potential voltage VSS, and the like.

The timing controller 150 continuously senses operational conditions of the display device from the image pattern detector 156 and the temperature detector 157 during operation of the display device (S1002). The timing controller 150 detects an operational condition to which a power setting value different from the power setting value currently being output is to be applied (S1003).

The timing controller 150 reads an appropriate power setting value from the memory block according to the changed operational condition and outputs the appropriate power setting value to the PMIC 210 through the I2C interface (S1004).

The PMIC 210 receives the power setting value output from the timing controller 150 and stores the power setting value in the second storage bank 242 which is in the inactive state (S2003).

After transmitting all of the power setting values, the timing controller 150 changes the state of the enable signal EN from a low state to a high state (S1005).

After detecting the change of the state of the enable signal EN, the PMIC 210 activates the second storage bank 242 and reads the stored power setting value (S2004).

The power generator 250 of the PMIC 210 adjusts the output voltage to the updated power setting value and outputs the adjusted output voltage (S2005).

After the output voltage is adjusted, the timing controller 150 senses the operational conditions of the display device (S1006).

As set forth hereinabove, a power device of a display device according to one or more exemplary embodiments may output an optimal driving voltage in conjunction with a change in operating conditions of a display image and a surrounding environment of the display device. According to one or more exemplary embodiments, a change of the surrounding environment may be detected by a timing controller and transmitted in the real time through an I2C interface, and accordingly, a PMIC may be implement using only two storage banks in which voltage setting values are stored.

While the invention has been illustrated and described with reference to the exemplary embodiments thereof, it will be apparent to those of ordinary skill in the art that various changes in form and detail may be formed thereto without departing from the spirit and scope of the invention.

What is claimed is:

1. A display device comprising:
a display panel;
a plurality of pixels arranged on the display panel;
a data driver and a gate driver which respectively apply an image data signal and a gate pulse signal to the plurality of pixels;
a timing controller which applies control signals respectively to the data driver and the gate driver; and
a power management integrated circuit which applies a driving voltage to the data driver and the gate driver,
wherein the timing controller detects an operational condition of the display panel and selects one of a plurality of stored power settings each having a plurality of power setting values, to output the selected power setting values to the power management integrated circuit based on the detected operational condition, and
the power management integrated circuit comprises:
a first storage bank;
a second storage bank;
a controller which receives the power setting values from the timing controller, stores the received power setting values in one of the first storage bank and the second storage bank, and calls the stored power setting values to determine the driving voltage; and
a power generator which applies the driving voltage based on the driving voltage determined by the controller,
wherein the operational condition of the display panel comprises an operating temperature of the display device and an image input condition that indicates whether the display device is displaying a two dimensional image or a three dimensional stereoscopic image,
wherein a change of a surrounding environment including a change in use environmental temperature is detected by the timing controller and transmitted in real time to the power management integrated circuit, which uses only the first and second storage banks in which the stored power setting values are stored,
wherein the driving voltage is adjusted in consideration of detection of the operating temperature, the image input condition, and the use environmental temperature, and
wherein, after calling all of the power setting values stored in said one of the first storage bank and the second storage bank, the controller receives subsequent power setting values responsive to change in the operational condition or the surrounding environment from the timing controller, and stores said subsequent power setting values in the other of the first storage bank and the second storage bank.

2. The display device of claim 1, further comprising a single-line enable signal and an inter-integrated circuit interface which connect the timing controller and the power management integrated circuit.

3. The display device of claim 2, wherein the timing controller transmits optimal power setting values corresponding to the operational condition of the display panel to the power management integrated circuit through the inter-integrated circuit interface.

4. The display device of claim 3, wherein the timing controller switches an output state of the single-line enable signal after the optimal power setting values is transmitted through the inter-integrated circuit interface.

5. The display device of claim 3, wherein the power setting values comprises at least one of a driving voltage of the display panel, a slope, a frequency, and a voltage transition time.

6. The display device of claim 1, wherein the timing controller comprises a plurality of memory blocks comprising optimal power setting values which differ from one another depending on the operational condition of the display panel.

7. The display device of claim 1, wherein the timing controller is connected to the power management integrated circuit only through an inter-integrated circuit interface, and the power management integrated circuit further comprises an enable register selecting the first storage bank or the second storage bank.

8. The display device of claim 7, wherein the timing controller transmits power setting values corresponding to the operational condition of the display panel and a digital code to select the first storage bank or the second storage bank to the power management integrated circuit through the inter-integrated circuit interface.

9. The display device of claim 8, wherein the digital code is one bit of 0 or 1.

10. A method of driving a display device, the method comprising:

referring to, by a power management integrated circuit, a stored initial power setting having a plurality of power setting values, and storing the initial power setting values in a first storage bank in an initial driving of the display device;

referring to, by the power management integrated circuit, the initial power setting values stored in the first storage bank;

outputting, by the power management integrated circuit, a driving voltage corresponding to the initial power setting values;

detecting, by a timing controller, an image input condition and an operating temperature to sense an operational condition of the display device;

referring to, by the timing controller, optimal power setting values corresponding to the operational condition of the display device from a stored table;

transmitting, by the timing controller, the optimal power setting values to the power management integrated circuit;

storing, by the power management integrated circuit, the optimal power setting values in a second storage bank;

referring to, by the power management integrated circuit, the optimal power setting values stored in the second storage bank; and adjusting, by the power management integrated circuit, an output to a driving voltage corresponding to the optimal power setting values, wherein the image input condition indicates whether the display device is displaying a two dimensional image or a three dimensional stereoscopic image, detecting, by the timing controller, a change of a surrounding environment including a change in use environmental temperature, and transmitting it in real time to the power management integrated circuit, which uses only the first and second storage banks in which the stored power setting values are stored, adjusting the driving voltage in consideration of detection of the operating temperature, the image input condition, and the use environmental temperature, and after referring to all of the power setting values stored in said second storage bank, receiving, by the controller, subsequent power setting values responsive to change in the operational condition or the surrounding environment from the timing controller, and storing said subsequent power setting values in the first storage bank.

11. The method of claim 10, wherein the transmitting, by the timing controller, the optimal power setting values to the power management integrated circuit comprises transmitting, by the timing controller, the optimal power setting values through an inter-integrated circuit interface.

12. The method of claim 10, wherein the timing controller further outputs an enable signal which notifies that the transmission of the optimal power setting values are completed, and the power management integrated circuit detects a change of the enable signal and refers to the optimal power setting values stored in the second storage bank.

13. The method of claim 10, wherein the timing controller transmits a digital code to select the storage bank through an inter-integrated circuit interface, and the power management integrated circuit stores the digital code in an enable registry and refers to the power setting values from the first storage bank or the second storage bank which corresponds to the digital code.

14. The method of claim 10, wherein, when the power management integrated circuit adjusts the output to the driving voltage corresponding to the optimal power setting values, a variation slope of the driving voltage is less than about 100 millivolts per second.

* * * * *